(12) United States Patent
Tamura et al.

(10) Patent No.: US 11,390,116 B2
(45) Date of Patent: Jul. 19, 2022

(54) FRONT AXLE BEAM AND PRODUCTION METHOD THEREOF

(71) Applicant: NIPPON STEEL CORPORATION, Tokyo (JP)

(72) Inventors: Kenji Tamura, Tokyo (JP); Kenji Imanishi, Tokyo (JP); Sam Soo Hwang, Tokyo (JP); Kunihiro Yabuno, Tokyo (JP); Kunihiro Yoshida, Tokyo (JP); Koichiro Ishihara, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 452 days.

(21) Appl. No.: 16/499,454

(22) PCT Filed: Apr. 3, 2018

(86) PCT No.: PCT/JP2018/014215
§ 371 (c)(1),
(2) Date: Sep. 30, 2019

(87) PCT Pub. No.: WO2018/186380
PCT Pub. Date: Oct. 11, 2018

(65) Prior Publication Data
US 2020/0039291 A1    Feb. 6, 2020

(30) Foreign Application Priority Data

Apr. 5, 2017 (JP) .............................. JP2017-074955

(51) Int. Cl.
*B60B 35/06* (2006.01)
*B21J 5/06* (2006.01)
(Continued)

(52) U.S. Cl.
CPC ................. *B60B 35/06* (2013.01); *B21J 5/06* (2013.01); *B21K 1/12* (2013.01); *B60B 35/004* (2013.01); *B60G 9/04* (2013.01); *B62D 7/18* (2013.01)

(58) Field of Classification Search
CPC   B60B 35/06; B60B 35/004; B21J 5/06; B21J 5/02; B21K 1/12; B60G 9/04;
(Continued)

(56) References Cited

U.S. PATENT DOCUMENTS 2,911,262 A * 11/1959 Franck .................... B60B 35/06
                                                          301/124.1
5,588,660 A * 12/1996 Paddison ................. B62D 7/18
                                                          280/93.512
(Continued)

FOREIGN PATENT DOCUMENTS

JP          58164907 U       11/1983
JP          59078741 A        5/1984
(Continued)

OTHER PUBLICATIONS

ISR issued in Int'l, application No. PCT/JP2018/014215, dated Jul. 10, 2018.

*Primary Examiner* — S. Joseph Morano
*Assistant Examiner* — Emily G. Castonguay
(74) *Attorney, Agent, or Firm* — Greer, Burns & Crain, Ltd.

(57) ABSTRACT

The production method disclosed is a method for producing a front axle beam. The production method includes a die forging step and a bending step. The die forging step is a step of forging a steel material with dies to produce a forged product including a rough web part, which is to be formed into a web part, and four plate-shaped rough flange parts protruding frontward and rearward from an upper side and a lower side of the rough web part, respectively. The bending
(Continued)

step is a step of pressing at least one specified rough flange part, which is at least one of the four rough flange parts, with a first die to form a bent portion in the specified rough flange part such that the bent portion is bent inward in an up-down direction of the forged product.

10 Claims, 11 Drawing Sheets

(51) Int. Cl.
     *B21K 1/12*       (2006.01)
     *B60B 35/00*    (2006.01)
     *B60G 9/04*       (2006.01)
     *B62D 7/18*       (2006.01)

(58) Field of Classification Search
     CPC ..... B62D 7/18; E04C 2003/0452; B61F 1/12; B61F 3/02; B61F 5/04
     See application file for complete search history.

(56) References Cited

U.S. PATENT DOCUMENTS

| 5,741,027 A * | 4/1998 | Stroh | B60B 35/06 |
| | | | 180/905 |
| 2009/0230760 A1 | 9/2009 | Bubulka et al. | |
| 2020/0023424 A1* | 1/2020 | Tamura | B21K 1/12 |
| 2020/0023427 A1* | 1/2020 | Tamura | B21J 5/02 |

FOREIGN PATENT DOCUMENTS

| JP | 08193383 A | 7/1996 |
| JP | 09057352 A | 3/1997 |
| JP | 2003285771 A | 10/2003 |
| JP | 2007283330 A | 11/2007 |
| JP | 2009106955 A | 5/2009 |
| KR | 1020100124318 A | 11/2010 |

* cited by examiner

FRONT AXLE BEAM AND PRODUCTION METHOD THEREOF

This is a National Phase application filed under 35 U.S.C. § 371, of International Application No. PCT/JP2018/014215, filed Apr. 3, 2018, the contents of which are incorporated by reference

TECHNICAL FIELD

The present invention relates to a front axle beam and a production method thereof.

BACKGROUND ART

Usually, front wheels of a vehicle body (for example, front wheels of a motor truck, a bus or the like, excluding motor cycles) are attached to a front axle beam (which will be hereinafter referred to as a "front axle" in some cases), and the front axle beam with the front wheels attached thereto is used to support the vehicle body. The front axle is important as a part for transmitting the load of the vehicle body to the right and left front wheels and as a structure maintaining part. The front axle keeps the wheels in fixed positions and ensures steerability of the front wheels, thereby ensuring driving stability. Also, at a time of braking, the front axle functions as a braking force transmission route. Thus, the front axle is a part which strongly affects traveling performance, steering performance and braking performance. The front axle is required to have high rigidity and therefore is heavy. From the viewpoint of fuel efficiency, on the other hand, weight reduction of the front axle is demanded.

For driving stability, generally, heavy parts are arranged at low levels with respect to the vehicle height direction. Therefore, it is preferred that an engine, which is to be mounted on the front axle, is positioned at a low level with respect to the vehicle height direction. On both ends of the front axle, king-pin attachment parts are provided. An underbody is connected to the front wheels. Kingpins pass through the respective king-pin attachment parts along the body height direction from above and are inserted into the underbody attached to the front wheels. Thus, the kingpins connect the front axle and the wheels together. In this structure, when the vehicle body is steered, the front wheels turn about the respective kingpins. To form this structure of the vehicle body, the front axle is, for example, shaped like a bow of which center portion with respect to the vehicle width direction is at a low level and of which end portions with respect to the vehicle width direction are at a high level as shown in FIG. 2. The front axle has an H-shaped cross section, but unlike an H-steel, the front axle is not produced by a universal rolling machine. This is because it is impossible to form the bow-like shape by using a universal rolling machine.

A front axle is usually produced by die forging. In a case of producing a front axle by die forging, it is necessary to make draft angles Q and Q' as shown in FIG. 14, for example, for release of the product from the dies. This creates limitations on the shape of the front axle and eventually constrains improvement of the front axle in rigidity.

Japanese Patent Application Publication No. 2003-285771 (Patent Literature 1) provides a front axle that decreases aerodynamic drag while the vehicle is running. The object of the invention disclosed in Patent Literature 1 is to decrease aerodynamic drag and thereby to improve fuel efficiency.

Methods for producing a front axle have been provided up to now. Japanese Patent Application Publication No. 2009-106955 (Patent Literature 2) discloses a method for producing an axle beam with a right and a left spring attachment seat. In this production method, one of the spring attachment seats is press formed at a first pressing step, and the other spring attachment seat is press formed at a second pressing step.

One of the measures to reduce the weight of a front axle is increasing the rigidity of the front axle. An increase in the rigidity of a front axle will permit the front axle to have rigidity comparable to the rigidity of a conventional front axle while having a lighter weight and/or a smaller size. An increase in the rigidity of the front axle also will permit the front axle to improve various properties associated with rigidity while keeping the cross-sectional size and/or the weight same as those of a conventional front axle. Therefore, a new technique for increasing the rigidity of a front axle is demanded.

Meanwhile, around such a front axle, an engine and movable parts for steering are densely arranged. Accordingly, the front axle is required to be fitted in a small space without interfering with these surrounding parts. Therefore, a technique for increasing the rigidity of a front axle without increasing the cross-sectional size of the front axle is especially demanded.

CITATION LIST

Patent Literatures

Patent Literature 1: Japanese Patent Application Publication No. 2003-285771
Patent Literature 2: Japanese Patent Application Publication No. 2009-106955

SUMMARY OF INVENTION

Technical Problem

In the circumstances, an object of the present invention is to provide a front axle beam with increased rigidity, and a production method of the front axle beam.

Solution to Problem

A production method according to an embodiment of the present invention is a method for producing a front axle beam including a beam part, the beam part including a web part and flange parts joined on both sides of the web part and having an H-shaped cross section. In the production method, a material is forged by dies which are paired with each other at a central axis of the web part in the cross section of the beam part. Further, at least one specified flange part, which is at least one of the flange parts, is bent toward another one of the flange parts that is opposed to the specified flange part.

A front axle beam according to an embodiment of the present invention is a front axle beam including a beam part including a web part and flange parts joined on both sides of the web part and having an H-shaped cross section. In the cross section of the beam part, a space between an edge of at least one specified flange part, which is one of the flange parts, and an edge of another one of the flange parts that is opposed to the specified flange part is narrower than a length of the web part.

Advantageous Effects of Invention

The present invention provides a front axle beam with high rigidity. The production method according to the present invention facilitates production of the front axle beam.

DETAILED DESCRIPTION OF EMBODIMENTS

Figure 1:
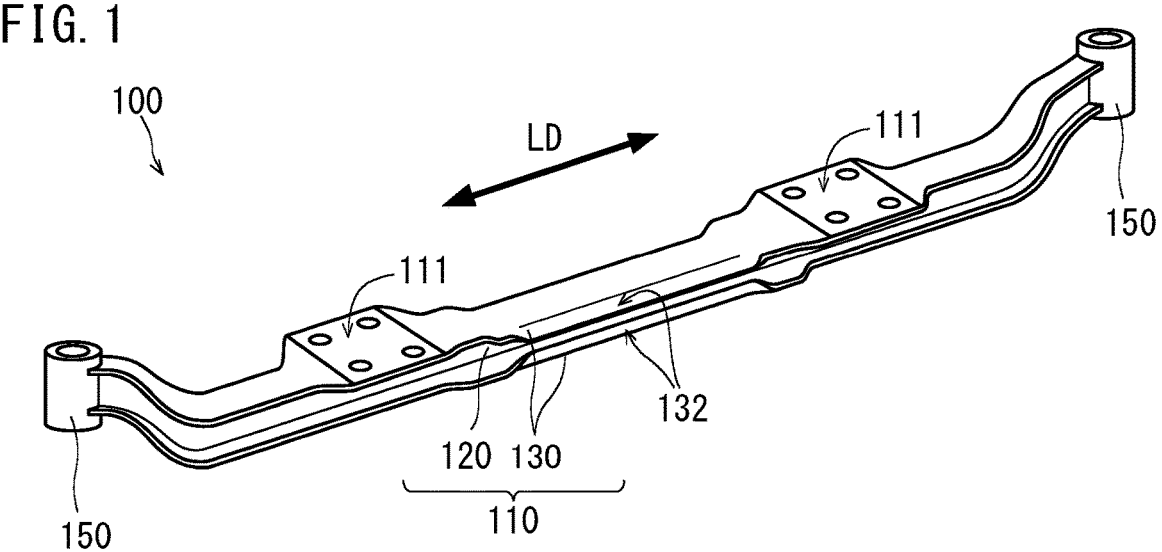
FIG. 1 is a perspective view schematically showing an exemplary front axle according to a first embodiment.

As a result of the inventors' earnest consideration, they found it possible to increase the rigidity of a front axle by adjusting the cross-sectional shape of the front axle. They also found a method for producing a front axle with high rigidity. The present invention has been made based on these findings.

A production method according to an embodiment of the present invention is a method for producing a front axle beam including a beam part, the beam part including a web part and flange parts joined on both sides of the web part and having an H-shaped cross section. In the production method, a material is forged by dies which are paired with each other at a central axis of the web part in the cross section of the beam part. Further, at least one specified flange part, which is at least one of the flange parts, is bent toward another one of the flange parts that is opposed to the specified flange part.

In the production method, the specified flange part may be bent into a curved shape.

A front axle beam according to an embodiment of the present invention is a front axle beam including a beam part including a web part and flange parts joined on both sides of the web part and having an H-shaped cross section. In the cross section of the beam part, a space between an edge of at least one specified flange part, which is one of the flange parts, and an edge of another one of the flange parts that is opposed to the specified flange part is narrower than a length of the web part.

In the front axle beam, the specified flange part may be curved in the cross section of the beam part.

When the front axle beam includes two spring attachment seats, the cross section of the beam part may be a cross section thereof at a site between the two spring attachment seats.

In another aspect, a production method according to an embodiment of the present invention is a method for producing a front axle beam including a beam part and two king-pin attachment parts provided to both ends of the beam part with respect to a length direction of the beam part. The beam part includes a web part extending in the length direction, and four flange parts protruding frontward and rearward from an upper side and a lower side of the web part, respectively. The production method comprises: a die forging step of forging a steel material with dies to produce a forged product that includes a rough web part to be formed into the web part, and four rough flange parts protruding frontward and rearward from an upper side and a lower side of the rough web part, respectively; and a bending step of pressing at least one specified rough flange part, which is at least one of the four rough flange parts, of the forged product with at least one first die to form a bent portion in the specified rough flange part, the bent portion being bent inward in an up-down direction of the forged product.

In the production method, the at least one specified rough flange part may include a first specified rough flange part and a second specified rough flange part that are arranged in a front-rear direction or in the up-down direction. The first die may include a first inclined surface and a second inclined surface that form an angle smaller than 180 degrees with each other. In this case, in the bending step, the first specified rough flange part may be pressed by the first inclined surface of the first die, and the second specified rough flange part may be pressed by the second inclined surface of the first die.

In the production method, when a not-to-be-bent rough flange part, which is another one of the rough flange parts and which will not have a bent portion, and the specified rough flange part are arranged in the front-rear direction, in the bending step, the bent portion is formed in the specified rough flange part while the not-to-be-bent rough flange part is held.

In the production method, the at least one specified rough flange part may include a first, a second, a third and a fourth specified rough flange part. In this case, in the bending step, the first and second specified rough flange parts may be pressed by the first inclined surface and the second inclined surface, respectively, of one first die, and at the same time, the third and fourth specified rough flange parts may be pressed by the first inclined surface and the second inclined surface, respectively, of another first die.

In the production method, when the first and second specified rough flange parts are arranged in the up-down direction of the forged product, the bending step may be performed by moving the first die in the front-rear direction. In this production method, the bending step may be performed while a boundary between the two rough flange parts protruding from the upper side of the rough web part and a boundary between the other two rough flange parts protruding from the lower side of the rough web part are supported by two second dies, respectively, from opposite sides in the up-down direction.

In the production method, when the first and second specified rough flange parts are arranged in the front-rear direction of the forged product, the bending step may be performed by moving the first die in the up-down direction of the forged product. In this production method, the bending step may be performed while the rough web part is held between two second dies from opposite sides in the front-rear direction.

In still another aspect, a front axle beam according to an embodiment of the present invention includes a beam part, and two king-pin attachment parts provided to both ends of the beam part with respect to a length direction of the beam part. The beam part includes a web part extending in the length direction, and four flange parts protruding frontward and rearward from an upper side and a lower side of the web part, respectively. At least one of the four flange parts is a specified flange part including a bent portion. The bent portion is bent to become closer to another one of the flange parts that is opposed to the specified flange part as the distance from its edge decreases.

In the front axle beam, it is preferred that the four flange parts include two specified flange parts that are arranged in a front-rear direction or in an up-down direction.

Some embodiments of the present invention will hereinafter be described. The present invention is not limited to the embodiments below.

In this specification, unless any specific mention is made, directions concerning a front axle and components thereof mean directions when the front axle is used. For example, unless any specific mention is made, an up-down direction concerning a front axle means the up-down direction when the front axle is used. In other words, the up-down direction concerning the front axle means the vehicle height direction. Likewise, a right-left direction concerning the front axle and a front-rear direction concerning the front axle mean these directions when the front axle is used. Specifically, the right-left direction concerning the front axle means the vehicle width direction. The front-rear direction concerning the front axle means the vehicle length direction. The front axle includes a beam part having an H-shaped cross section. This beam part includes a plate-like web part, and four plate-like flange parts protruding from both sides of the web part. When the front axle is used, the beam part is placed horizontally. In a cross section of the front axle, the web part extends in the up-down direction, and the four flanges protrude in the front-rear direction. Accordingly, in the cross section of the front axle, the up-down direction is the web part extending direction, and the front-rear direction is a direction perpendicular to the web part extending direction. Further, a front side and a rear side of the front axle conform with the front side and the rear side of the vehicle in which the front axle is used. However, in a case where the front axle has a symmetric shape with respect to the front-rear direction, either one of these sides is considered as a front side, and the other side is considered as a rear side. Moreover, unless any specific mention is made, directions concerning an intermediate product of the front axle (a forged product) and components thereof conform with the directions concerning the front axle as a final product.

(Production Method of Front Axle Beam)

A production method according to an embodiment is a method for producing a front axle (front axle beam) including a beam part, and two king-pin attachment parts provided to both ends of the beam part with respect to the length direction of the beam part. The beam part includes a web part extending in the length direction of the beam part, and four flange parts protruding frontward and rearward from the upper and the lower side of the web part, respectively. Thus, the production method according to the embodiment is a method for producing a front axle (front axle beam) including a beam part that includes a web part and flange parts joined on both sides of the web part and has an H-shaped cross section. The production method includes a die forging step and a bending step as will be described below. In this disclosure, joining means merely unifying but does not always mean connecting by welding, fastening or the like.

Figure 5A:
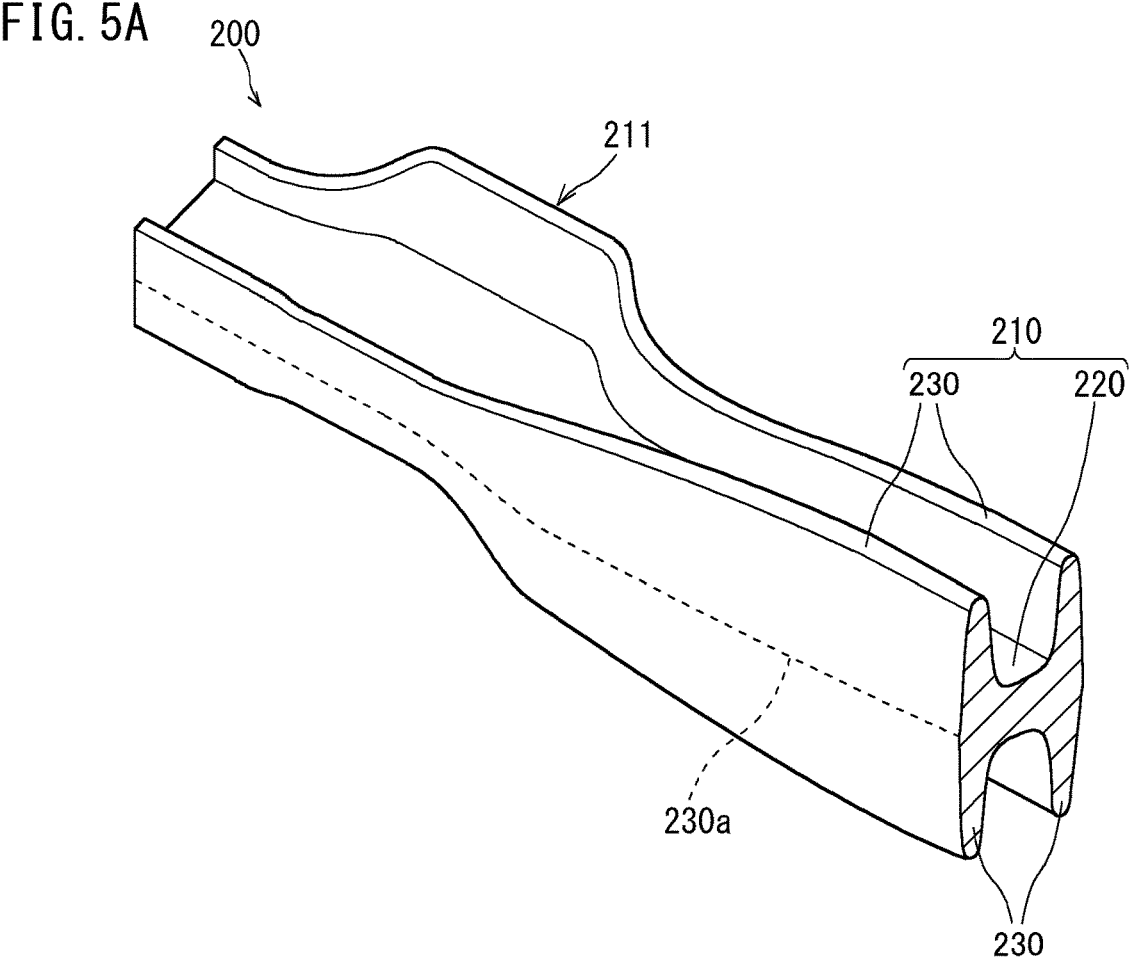
FIG. 5A is a perspective view schematically showing a part of an exemplary forged product produced by a die forging step of a production method according to a second embodiment.
Figure 5B:
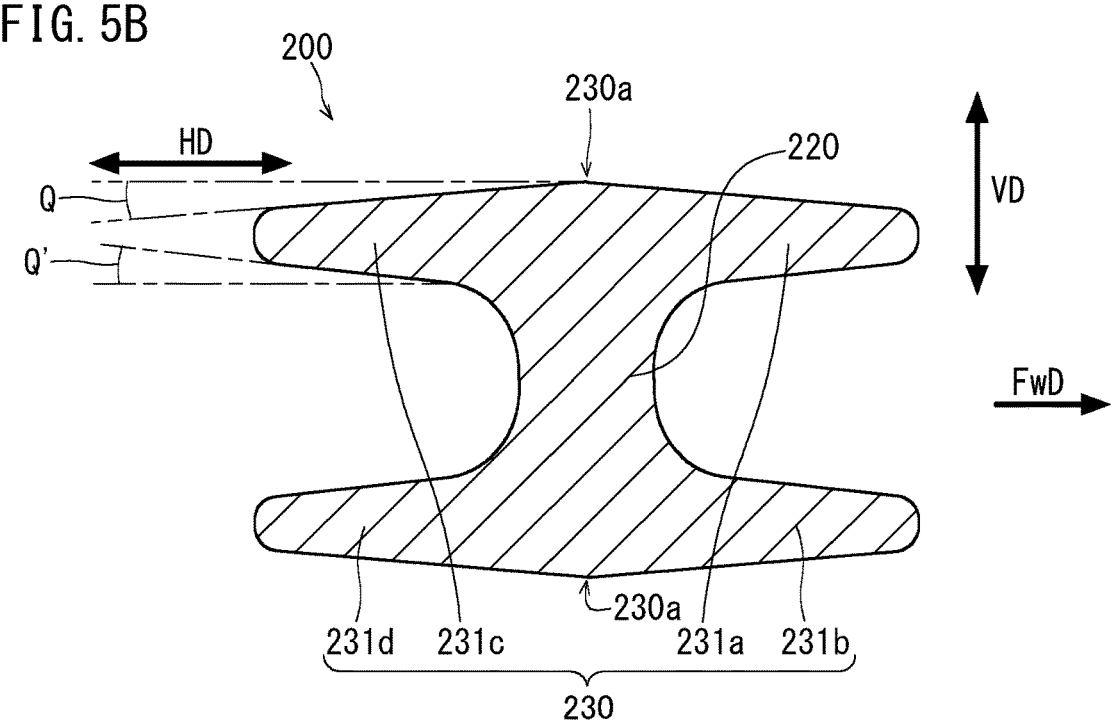
FIG. 5B is a view schematically showing a cross section of the forged product shown in FIG. 5A.

The die forging step is a step of forging a steel material with dies to produce a forged product (for example, a product shown in FIGS. 5A and 5B). The forged product includes a rough web part to be formed into the web part, and four plate-shaped rough flange parts protruding frontward and rearward from the upper side and the lower side of the rough web part, respectively. The four rough flange parts are to be formed into the four flange parts of the front axle.

In the production method according to the embodiment, a material (a steel material) is forged by a pair of dies (forging dies). The dies are paired with each other with the center line of the web part (rough web part) defined as a contact face.

Usually, the forged product, which is produced by the die forging step, has flash. Therefore, a flash-trimming step to remove the flash may be performed between the die forging step and the bending step. The removal of flash may be performed by any flash-trimming method, and a conventional method may be adopted. In a case where such a flash-trimming step is performed, the forged product with the flash removed is sent to the bending step.

The bending step is a step of pressing at least one specified rough flange part, which is at least one of the four rough flange parts, with at least one first die to form a bent portion in the specified rough flange part, the bent portion being bent inward in the up-down direction of the forged product.

In other words, in the production method, at least one of the flange parts (at least one specified rough flange part) is bent toward another one of the flange parts (which is another specified rough flange part or a not-to-be-bent (non-specified) rough flange part) that is located opposite to the specified rough flange part. The bent flange part may be curved.

In this specification, an inner side and an outer side of a flange part (or a rough flange part) mean the inner side and the outer side with respect to the up-down direction VD of the front axle or the forged product, unless it is inconsistent with the context. Regarding a flange part (or a rough flange part) protruding from the upper side of the web part (or the rough web part), the inner side means the lower side thereof, and the outer side means the upper side thereof. Regarding a flange part (or a rough flange part) protruding from the lower side of the web part (or the rough web part), the inner side means the upper side thereof, and the outer side means the lower side thereof.

Figure 4:
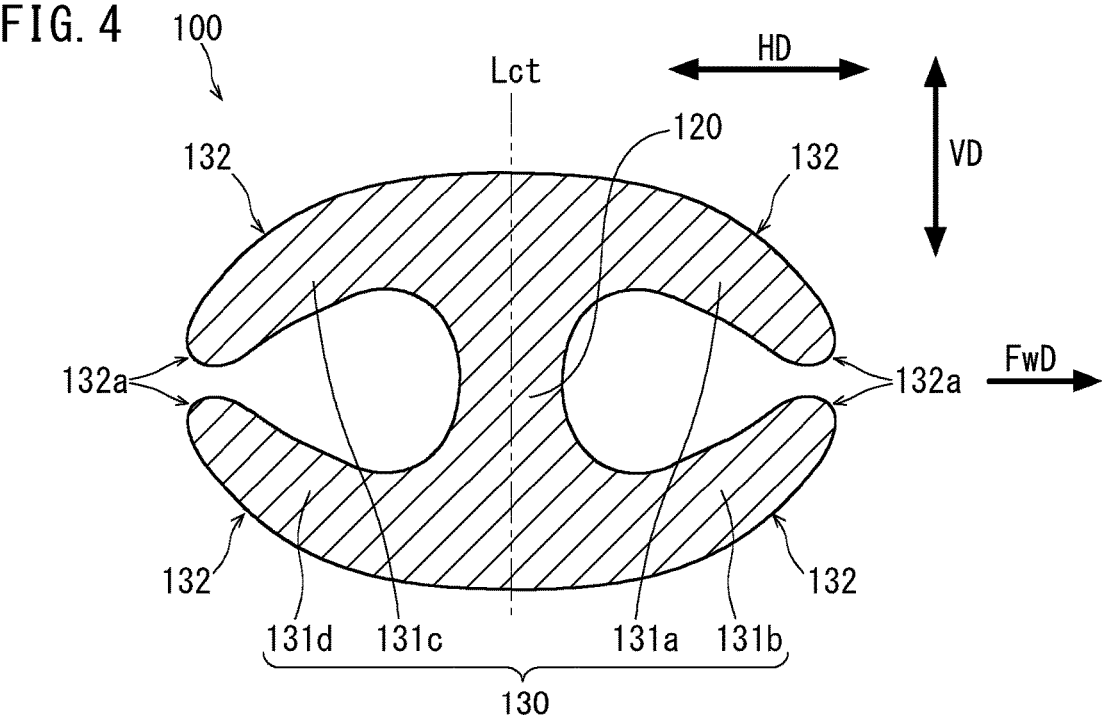
FIG. 4 is a view schematically showing a cross section of the front axle shown in FIG. 1.

At least one (one, two, three or four) of the four rough flange parts is a specified rough flange part including a bent portion (for example, a portion 132 shown in FIG. 4). In view of manufacture, it is preferred that two rough flange parts in alignment are bent at a time. Accordingly, in a preferred embodiment, two or four of the four rough flange parts are specified rough flange parts.

The bent portion may be formed over the entire length of the beam part or in some part of the length of the beam part. The front axle typically has two spring attachment seats. The bent portion may be formed in the entire region or some of the region between the two spring attachment seats.

The at least one specified rough flange part may include a first specified rough flange part and a second specified rough flange part that are arranged in the up-down direction. The first die may include a first inclined surface and a second inclined surface (for example, surfaces 310a and 310b shown in FIG. 6A) that form an angle smaller than 180 degrees with each other. In this case, in the bending step, the first inclined surface of the first die may press the first specified rough flange part, and the second inclined surface of the first die may press the second specified rough flange part.

The angle P between the first inclined surface and the second inclined surface may be set at any angle, as long as it permits the bending step to be surely conducted. The angle P may be, for example, in the range from 30 to 170 degrees. The angle P may be in the range from 90 to 160 degrees. An example of the first die is a die with a concave portion including a first inclined surface and a second inclined surface. The concave portion, for example, may have a V-shaped cross section (see FIG. 6A), a U-shaped cross section (see FIG. 8A), or the like. The first die may be composed of a die with a first inclined surface and another die with a second inclined surface.

In a case in which a not-to-be-bent rough flange part (a rough flange part which will not have a bent portion) and a specified rough flange part are arranged in the front-rear direction, in the bending step, the bent portion may be formed in the specified rough flange part while the not-to-be-bent rough flange part is held. This prevents the not-to-be-bent rough flange part from being displaced by the force applied to the specified rough flange part for the forming of the bent portion.

In the production method, the at least one specified rough flange part may include a first, a second, a third and a fourth specified rough flange part. In other words, all of the four rough flange parts may be specified rough flange parts. In this case, in the bending step, the first and second specified rough flange parts may be pressed by a first inclined surface and a second inclined surface, respectively, of one first die, and at the same time, the third and fourth specified rough flange parts may be pressed by a first inclined surface and a second inclined surface, respectively, of another first die.

The first and second specified rough flange parts may be arranged in the up-down direction of the forged product or may be arranged in the front-rear direction of the forged product. An exemplary bending step in the former case (a first exemplary bending step) and an exemplary bending step in the latter case (a second exemplary bending step) will be described below. The case in which all of the four rough flange parts are specified rough flange parts can be considered as the former case and as the latter case. In this case, as mentioned above, the forged product may be pressed by two first dies.

A first exemplary bending step is performed in a case in which the first and second specified rough flange parts are arranged in the up-down direction. In the first exemplary bending step, the first die is moved in the front-rear direction of the forged product. The first specified rough flange part is pressed by the first inclined surface of the first die, and the second specified rough flange part is pressed by the second inclined surface of the first die. Thereby, bent portions are formed in the first and second specified rough flange parts at the same time (see FIG. 6B, for example).

The first exemplary bending step may be performed while the boundary between the two rough flange parts protruding from the upper side of the rough web part and the boundary between the two rough flange parts protruding from the lower side of the rough web part are supported by two second dies, respectively, from opposite sides in the up-down direction. Among the four rough flange parts, two rough flange parts arranged in the up-down direction are the first and second specified rough flange parts. Supporting the boundaries by use of the two second dies makes it possible to keep the forged product in a stable position, which assures accurate performance of the bending step.

A second exemplary bending step is performed in a case in which the first and second specified rough flange parts are arranged in the front-rear direction. In the second exemplary bending step, the first die is moved in the up-down direction of the forged product. The first specified rough flange part is pressed by the first inclined surface of the first die, and the second specified rough flange part is pressed by the second inclined surface of the first die. Thereby, bent portions are formed in the first and second specified rough flange parts at the same time.

The second exemplary bending step may be performed while the rough web part is pinched and held between two second dies from opposite sides in the front-rear direction. A great force is applied to the specified rough flange part during the bending step, and therefore, it is preferred that the bending step is performed while the rough web part is held between the two second dies. Holding the rough web part between the two second dies makes it possible to keep the forged product in a stable position, which assures accurate performance of the bending step, and to prevent deformation of the rough web part (see FIG. 7B, for example).

(Front Axle Beam)

A front axle (a front axle beam) according to an embodiment of the present invention is produced by the production method according to the embodiment. The description of the production method according to the embodiment applies to the front axle according to the embodiment, and the overlapping description will be omitted from the following description of the front axle. Also, the description of the front axle applies to the production method according to the embodiment. The front axle according to the embodiment may be produced by any other method than the production method according to the embodiment.

The front axle according to the embodiment has a beam part including a web part, and four flange parts joined on both sides of the web part, and the beam part has an H-shaped cross section. The space between the respective edges of opposite two flange parts is narrower than the length of the web part in the cross section of the beam part. This is because at least one of the two flange parts is a specified flange part including a bent portion. In this disclosure, joining means merely unifying and does not always mean connecting by welding, fastening or the like.

The front axle according to the embodiment includes not only the beam part but also two king-pin attachment parts provided to both ends of the beam part with respect to the length direction of the beam part. The beam part includes a web part extending in the length direction of the beam part, and four flange parts protruding frontward and rearward from the upper side and the lower side of the web part, respectively. At least one of the four flange parts is a specified flange part including a bent portion. The bent portion is bent to become closer to another one of the flange parts that is opposed to the specified flange part as the distance from its edge decreases. The flange part that is opposed to the specified flange part means the flange part that is in alignment with the specified flange part in the up-down direction. This flange part may be a specified flange part. The bent portion is formed by the bending step described above.

The specified flange part includes the above-described bent portion. Accordingly, the space between the edge of the specified flange part and the edge of another flange part that is opposed to the specified flange part is narrower than the length of the web part in a cross section of the front axle. In this case, in the cross section of the front axle, in a limited range, the center of gravity of the specified flange part is located at a position relatively far from the center of gravity of the beam part. Accordingly, it is possible to increase the second moment of area of the specified flange part without increasing the size of the cross section of the front axle, as compared with a flat-plate-shaped flange part of a conventional front axle. Thereby, according to the embodiment, it becomes possible to improve the rigidity (bending rigidity in the front-rear direction HD) of the front axle without increasing the size of the the cross section of the front axle. Since the specified flange part includes the bent portion, when compared with a conventional flange part, a large part of the flange part is distributed in a region far from the center of gravity of the beam part in the cross section of the front axle, along the direction of torsion (circumferential direction). Accordingly, the specified flange part has an increased polar moment of inertia. Thereby, according to the embodiment, it becomes possible to improve the torsional rigidity of the front axle without increasing the size of the cross section of the front axle.

From another point of view, when the bent portion of the specified flange part is viewed horizontally from a side in which the specified flange part protrudes, a part of the inner surface thereof with respect to the up-down direction VD is invisible. The bent portion with the invisible part has an inverse draft in a die forging step, and it is difficult to form the bent portion only by die forging. For this reason, when the specified flange part is to be formed by a production method including a die forging step, it is necessary to perform the above-described bending step. On the contrary, the bent portion can be formed easily by the above-described production method, which includes a die forging step and a bending step. Accordingly, the front axle according to the embodiment has an advantage in terms of manufacturing.

The length of the web part in the cross section of front axle is defined as follows, considering the joints between the web part and the respective flange parts. In a cross section of the beam part, the outline of the base of the web part is not straight but curved. That is, the corner R at the base of the web part is in the shape of a circular arc. Regarding two flange parts joined together, the middle point of the thickness at a part of each flange part that is near the web part but out of contact with the web part is determined on each side of the web part. The direction in which the line connecting the middle points of the thickness on both sides of the web part extends is referred to as a flange protruding direction. A tangent line to the corner R at a tangent point which is closer to the center of the web part forms a greater angle with the flange protruding direction. The tangent point at which the tangent line to the corner R forms an angle of 10 degrees with the flange protruding direction is determined on each side of the web part. The straight line connecting such tangent points on both sides of the web part is considered as a boundary of the web part. Based on this boundary, the length of the web part in the cross section of the front axle is evaluated.

Figure 14:
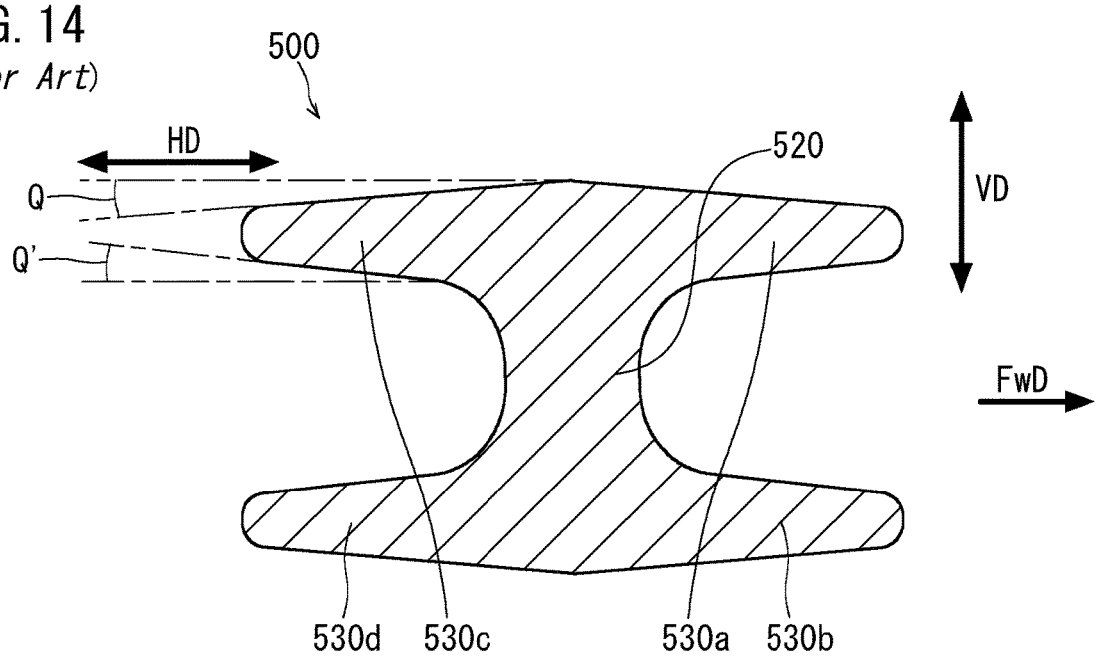
FIG. 14 is a view schematically showing a cross section of a conventional front axle.

A cross section (a section along a line perpendicular to the length direction LD) of a conventional front axle 500 is shown in FIG. 14. When the front axle is produced by die forging, dies (forging dies) are moved in directions in which flange parts 530*a* to 530*d* protrude (in the front-rear direction HD (direction perpendicular to the extending direction of a web part 520 in cross section)). Therefore, draft angles are provided for the flange parts 530*a* to 530*d*. In FIG. 14, draft angles Q and Q' to the die forging direction (front-rear direction HD) are shown. Because of these draft angles Q and Q', in the conventional front axle 500, the space between two opposite flange parts (for example, between the flange part 530*a* and the flange part 530*b*) becomes wider as the distance from the edges of the flange parts decreases. According to the embodiment, on the other hand, the space between the respective edges of two opposite flange parts is narrower than the length of the web part in the cross section of the front axle. In other words, the space between two opposite flange parts becomes narrower as the distance from the edges of the flange parts decreases.

The inclination angle of the bent portion relative to the horizontal direction may become greater as the distance from the boundary between the specified flange part and the web part increases. In short, the specified flange part with the bent portion may be curved.

At least one (one, two, three or four) of the four flange parts is a specified flange part. The at least one specified flange part may include two specified flange parts arranged in the front-rear direction or in the up-down direction. All of the four flange parts may be specified flange parts.

As mentioned above, the bent portion may be formed in at least some part of the region (in some part of the region or in the entire region) between the two spring attachment seats. For example, the bent portion may be formed in 50% or more of the region between the two spring attachment seats (based on the dimension in the length direction LD). Accordingly, a cross section including a specified flange part is a cross section at a site in the region between the two spring attachment seats.

(Producing Apparatus)

In another aspect, the present invention relates to a producing apparatus for producing a front axle. The producing apparatus includes the above-described die, and a mechanism for moving the die in the above-described way. As the mechanism for moving the die, a mechanism used in a conventional pressing machine may be used.

Some exemplary embodiments of the present invention will hereinafter be described with reference to the drawings. The embodiments which will be described below are only examples, and some parts of the embodiments below may be replaced with some parts of the above-described structure. In the following description, the same parts and members are denoted by the same reference numerals, and a repetitious description may be omitted. The drawings below are all schematic diagrams, and some parts that are unnecessary for the description may be omitted.

First Embodiment

Figure 2:
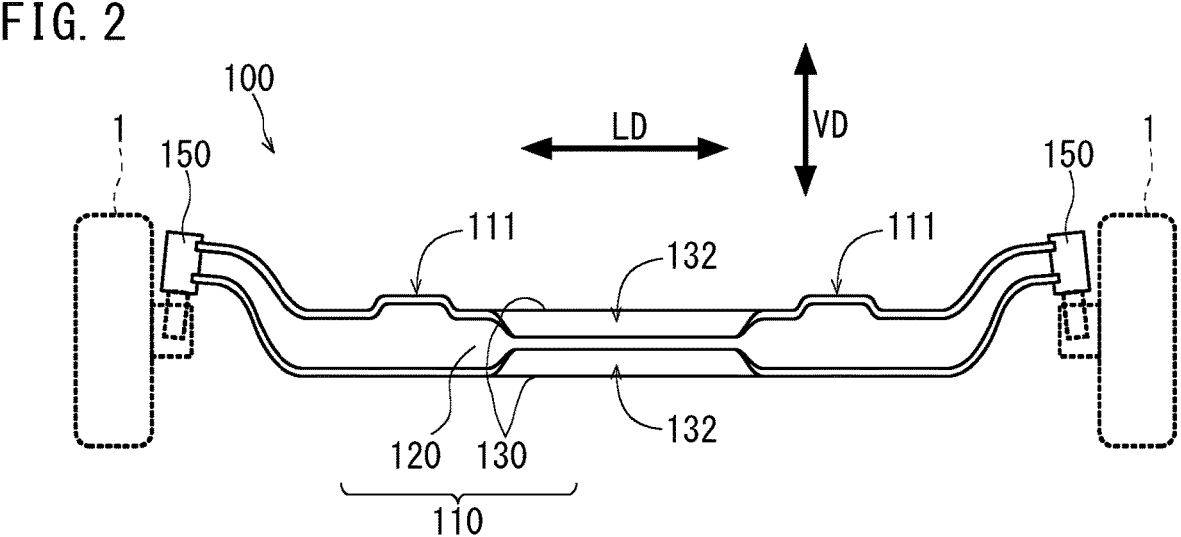
FIG. 2 is a view schematically showing the front side of the front axle shown in FIG. 1.
Figure 3:
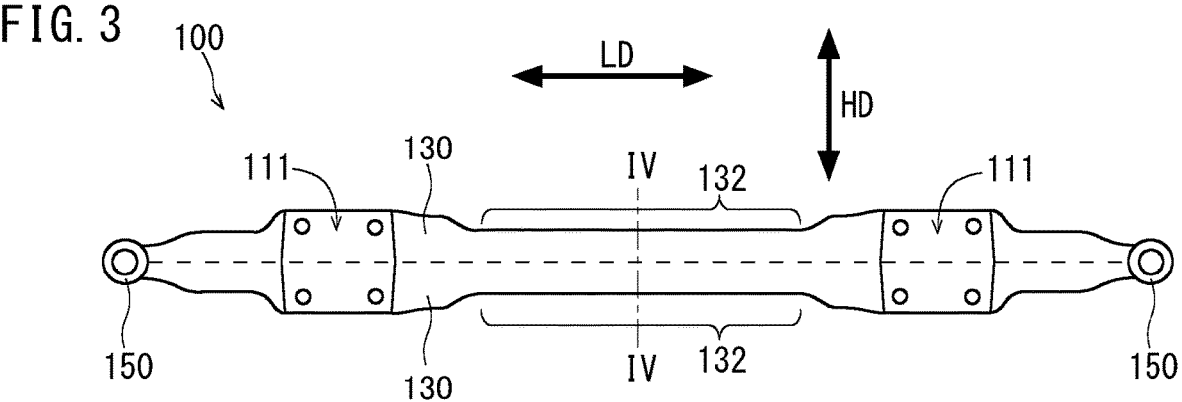
FIG. 3 is a view schematically showing the top side of the front axle shown in FIG. 1.

As a first embodiment, an exemplary front axle according to the present invention will be described. FIG. 1 is a perspective view of a front axle 100 according to the first embodiment. FIG. 2 is a front view of the front axle 100, that is, a view when the front axle 100 is viewed horizontally from front. FIG. 3 is a top view of the front axle 100. FIG. 4 is a cross-sectional view along the line IV-IV in FIG. 3. In some of these drawings and the drawings which will hereinafter be referred to, the frontward direction from the front axle 100 (or a first forged product 200) is denoted by FwD. In some of the drawings, the up-down direction is denoted by VD, and the front-rear direction is denoted by HD. In some of the drawings, also, the length direction of the beam part 110 (or a rough beam part 210) is denoted by LD.

With reference to FIG. 1, the front axle (front axle beam) 100 includes a beam part 110, and two king-pin attachment parts 150 provided to both ends of the beam part 110 with respect to the length direction LD of the beam part 110. Each of the king-pin attachment parts 150 has a through-hole in which a kingpin is to be inserted. Typically, the front axle 100 has a shape that is substantially symmetric with respect to the center of the vehicle width, and the whole shape of the front axle 100 is generally like a bow. As shown in FIG. 2, each of the king-pin attachment parts 150 is connected to a wheel end 1 via the kingpin.

The beam part 110 includes a web part 120 and four flange parts 130. The four flange parts 130 protrude frontward and rearward from the upper side and the lower side of the web part 120, respectively. Specifically, one of the four flange parts 130 protrudes frontward from the upper side of the web part 120, and another one of the four flange parts 130 protrudes rearward from the upper side of the web part 120. Another one of the four flange parts 130 protrudes frontward from the lower side of the web part 120, and the other one of the four flange parts 130 protrudes rearward from the lower side of the web part 120. From another point of view, the beam part 110 includes a web part 120 and four flange parts 130 joined on both sides of the web part 120, and the beam part has an H-shaped cross section. At least one of the four flange parts 130 is a specified flange part with a bent portion 132. FIGS. 1 to 4 show an example in which all of the four flange parts 130 are specified flange parts. As shown in FIG. 4, the bent portion 132 becomes closer to the opposite flange part 130 as the distance from its edge 132a decreases.

On the two flange parts protruding from the upper side of the web part 120, two spring attachment seats 111 are formed. The two spring attachment seats 111 are spaced from each other and located in lengthwise symmetrical positions. Springs are placed on the spring attachment seats 111, and on top of the springs, a vehicle body (including an engine) is set.

Now, the four specified flange parts are referred to as a first to a fourth specified flange part 131a to 131d. In the example shown in FIG. 4, the specified flange parts arranged vertically on the front side of the web part 120 are considered as the first and second specified flange parts 131a and 131b. The specified flange parts arranged vertically on the rear side of the web part 120 are considered as the third and fourth specified flange parts 131c and 131d. However, any of the specified flange parts may be considered as any of the first to fourth specified flange parts. For example, two specified flange parts arranged in the front-rear direction across a vertical line Lct passing through the center of the web part 120 equidistant from the front side and the rear side of the web part 120 may be considered as the first and second specified flange parts.

Each of the specified flange parts 131a-d includes a bent portion 132. In the first embodiment, the bent portions 132 are formed in the region between the spring attachment seats 111. However, the bent portions 132 may be formed in any other region.

In the example shown in FIGS. 1 to 4, all of the four flange parts 130 are specified flange parts, each of which includes a bent portion 132. However, it is only necessary that at least one of the flange parts 130 includes a bent portion 132. For example, of the four flange parts 130, only two flange parts arranged in the up-down direction VD may be specified flange parts. These specified flange parts may protrude frontward or rearward from the web part 120. Alternatively, of the four flange parts 130, only two flange parts arranged in the front-rear direction HD may be specified flange parts. These specified flange parts may be joined on the upper side of the web part 120 or on the lower side of the web part 120.

Second Embodiment

As a second embodiment, an example of a method for producing the front axle 100 shown in FIGS. 1-4 will hereinafter be described with reference to the drawings. This production method includes a die forging step and a bending step, which will be described later, to be performed in this order. The die forging step and the bending step are hot working that is performed with the workpiece heated.

In the die forging step, a specified forged product is produced by die forging a steel material. There is no limit to the die forging step, and a conventional die forging step may be adopted. Typically, the forged product obtained by the die forging step has flash. In the case where the forged product has flash, a flash-trimming step is performed before the forged product is subjected to the bending step. FIG. 5A is a perspective view of a part of the forged product 200 after subjected to the flash-trimming step, and in FIG. 5A, a cross section of the forged product 200 is seen.

The forged product 200 includes a rough beam part 210 to be formed into the beam part 110. The rough beam part 210 includes a rough web part 220 to be formed into the web part 120, and four plate-shaped rough flange parts 230 protruding frontward and rearward from the upper side and lower side of the rough web part 220, respectively. All of the four rough flange parts 230 are specified rough flange parts to be formed into the specified flange parts. On the forged product 200, parts 211 to be formed into the spring attachment seats 111 are formed.

FIG. 5B shows a cross section (a section perpendicular to the length direction LD) of the forged product 200. The cross section shown in FIG. 5B is a cross section at a portion to be formed into the bent portion 132. The four specified rough flange parts are a first to a fourth rough flange part 231a to 231d to be formed into the first to fourth flange parts 131a to 131d, respectively.

The die forging step is carried out by moving dies (forging dies) in the direction in which the rough flange parts 230 protrude, that is, in the front-rear direction HD (in the direction perpendicular to the extending direction of the rough web part 220 in cross section). The forging dies are paired with each other with the center line of the rough web part 220 defined as a contact face. Therefore, draft angles are set for the rough flange parts 230. In FIG. 5B, draft angles Q and Q' to the die forging direction (front-rear direction HD) are shown. Because of these draft angles, each of the rough flange parts 230 becomes thinner at the edge. In the example shown in FIG. 5B, the boundary 230a between two rough flange parts 230 that are adjacent to each other in the front-rear direction HD is on a flash line along which the removed flash lied.

A steel material used as a workpiece subjected to the die forging step typically has a proper shape for the die forging. Such a steel material can be produced by a preforming step of preforming a billet that is a starting material. In other words, the steel material may be a preformed product. There is no limit to the preforming step, and a conventional preforming step may be adopted. For example, the preforming step may include a billet rolling step and/or a bending step. The preforming step is typically hot working.

In the bending step, the specified flange parts are pressed by at least one first die such that a bent portion 232 (see FIG. 6B) that is bent inward in the up-down direction VD of the forged product 200 is formed in each of the specified flange parts. In other words, in the bending step, bent portions 232, which are to be formed into the bent portions 132, are formed. The bent portions 232 typically have the same shape as the bent portions 132. In short, the bent portions 232 become the bent portions 132 without any change.

Two examples of the bending step (a first exemplary bending step and a second exemplary bending step) will be described below. The first exemplary bending step is carried out in a case in which two specified rough flange parts are arranged in the up-down direction VD. In the first exemplary bending step, the first die is moved in the front-rear direction HD of the forged product 200. The second exemplary bending step is carried out in a case in which two specified rough flange parts are arranged in the front-rear direction HD. In the second exemplary bending step, the first die is moved in the up-down direction VD of the forged product 200. When all of the four rough flange parts 231 are specified rough flange parts, it can be considered as a case in which two specified rough flange parts are arranged in the front-rear direction HD and a case in which two specified rough flange parts are arranged in the up-down direction VD. In this case, therefore, both of the first exemplary bending step and the second exemplary bending step are adoptable.

First Exemplary Bending Step

Figure 6A:
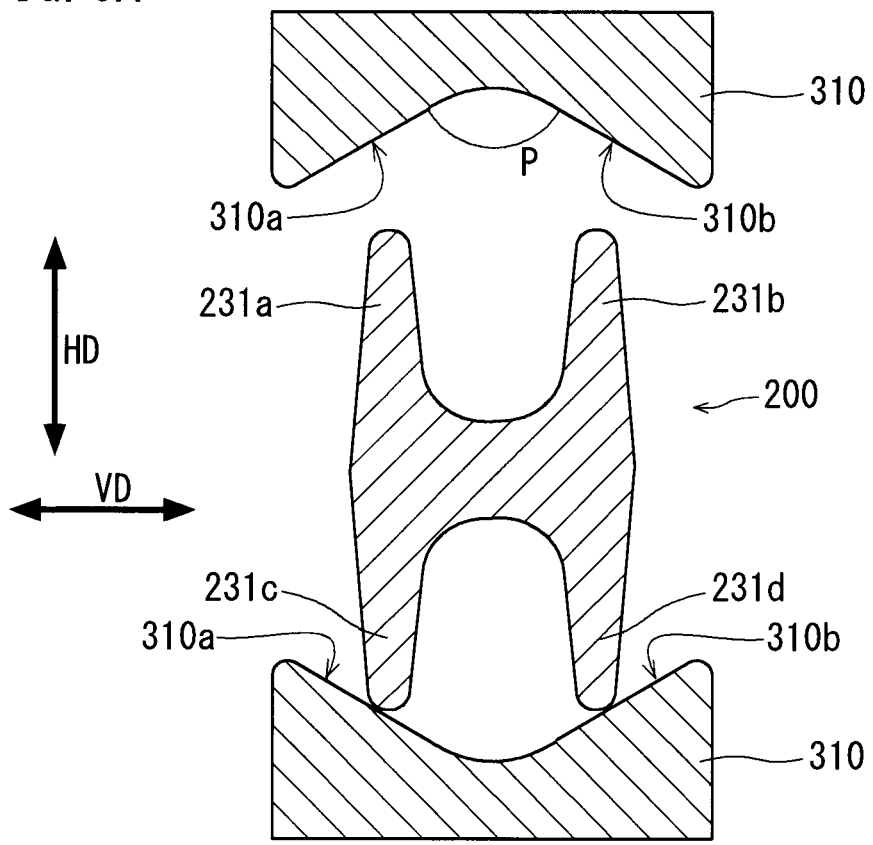
FIG. 6A is a cross-sectional view schematically showing a state before a start of deformation in an exemplary bending step.
Figure 6B:
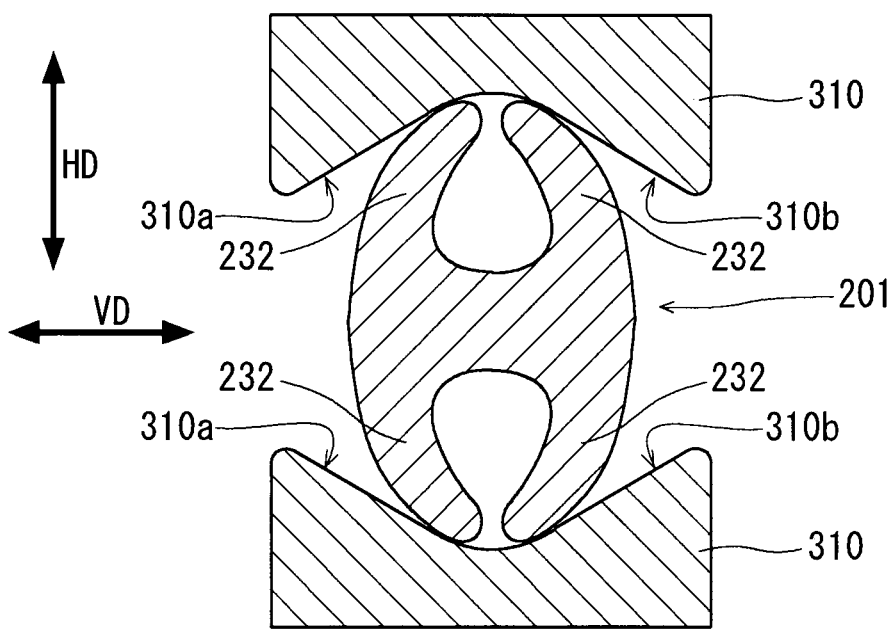
FIG. 6B is a cross-sectional view schematically showing a state on completion of deformation in the exemplary bending step shown in FIG. 6A.

The first exemplary bending step will be described with reference to FIGS. 6A and 6B. FIGS. 6A and 6B are sectional views of a part of the forged product where the bent portions 232 are to be formed. Here, the first to fourth specified rough flange parts 231a to 231d to be formed into the first to fourth specified flange parts 131a to 131d are designated as shown in FIGS. 6A and 6B. In this case, the first specified flange part 231a and the second specified flange part 231b are arranged in the up-down direction VD of the forged product 200.

In the first exemplary bending step, first, as shown in FIG. 6A, two first dies 310 are arranged on opposite sides of the forged product 200 in the front-rear direction HD. In a bending step, typically, at least one first die 310 is moved vertically (in the direction of gravitational force). Accordingly, the first exemplary bending step is carried out while the forged product 200 is positioned such that the front-rear direction HD of the forged product 200 is parallel to the direction of gravitational force.

Each of the first dies 310 includes a V-shaped concave portion. The concave portion of the first die 310 includes a first inclined surface 310a and a second inclined surface 310b. The angle P between the first inclined surface 310a and the second inclined surface 310b is within the range as described above. In the example shown in FIGS. 6A and 6B, the first inclined surface 310a and the second inclined surface 310b come into contact with the respective specified rough flange parts that are arranged in the up-down direction VD at the same angle. In this case, each of these inclined surfaces forms an angle of P/2 with the protruding direction of the specified rough flange parts. The protruding direction of the rough flange parts is the front-rear direction HD and is the same as the moving direction of the first die 310.

In the example shown in FIG. 6A, the first inclined surface 310a and the second inclined surface 310b are plane surfaces. However, these inclined surfaces may be curved surfaces. Such first dies 310 will be described later.

Next, as shown in FIG. 6B, at least one of the first dies 310 is moved in the front-rear direction HD of the forged product 200 to perform bending. By the bending, a forged product 201 with bent portions 232 are formed. Typically, the forged product 200 is placed on the lower first die 310, and only the upper first die 310 is moved, whereby bending is performed.

In the bending, two specified rough flange parts that are arranged in the up-down direction VD of the forged product 200 are pressed by the first inclined surface 310a and the second inclined surface 310b, respectively, of one first die 310 at the same time. In such a bending step, two or four bent portions can be formed accurately by one pressing. In the example shown in FIGS. 6A and 6B, the four specified rough flange parts are pressed by the two first inclined surfaces 310a and the two second inclined surfaces 310b, respectively, at the same time.

During the bending step, the forged product 200 may have flash. In this case, the flash stands on each boundary 230a between two rough flange parts 230 adjacent to each other in the front-rear direction HD (see FIG. 5B). Referring to FIGS. 6A and 6B, when the bending is applied to the forged product 200 with flash, the flash functions to suppress deformation of the rough flange parts 230 in the up-down direction VD. This permits accurate bending.

Figure 7A:
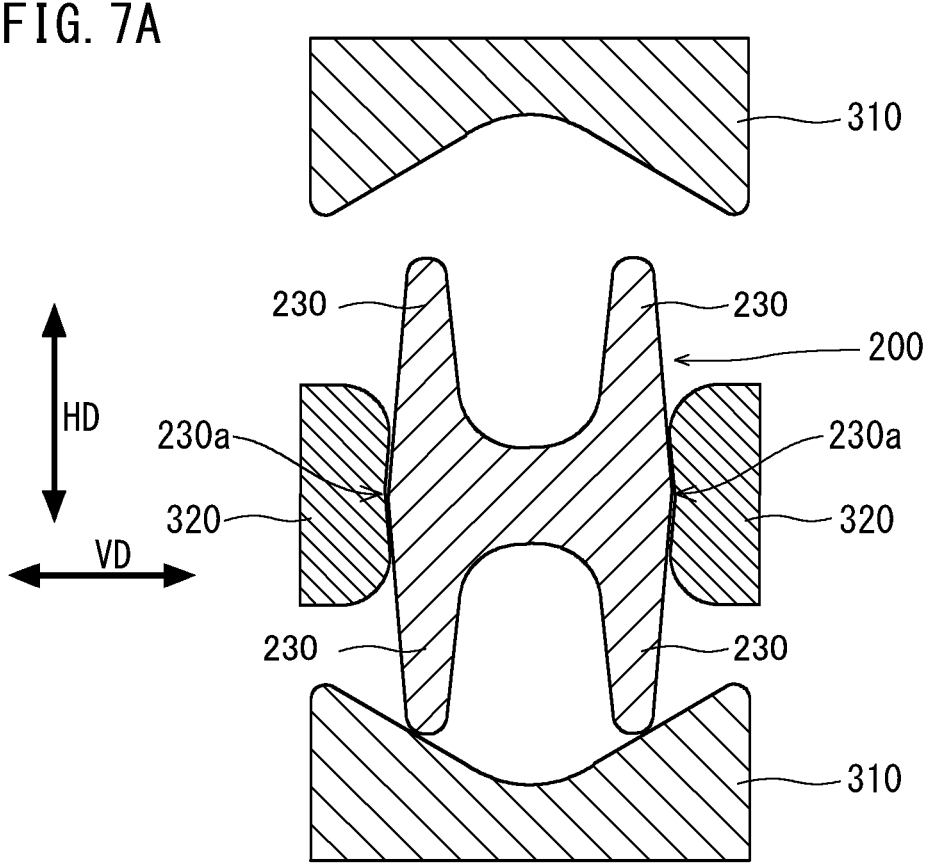
FIG. 7A is a cross-sectional view schematically showing a state before a start of deformation in another exemplary bending step.
Figure 7B:
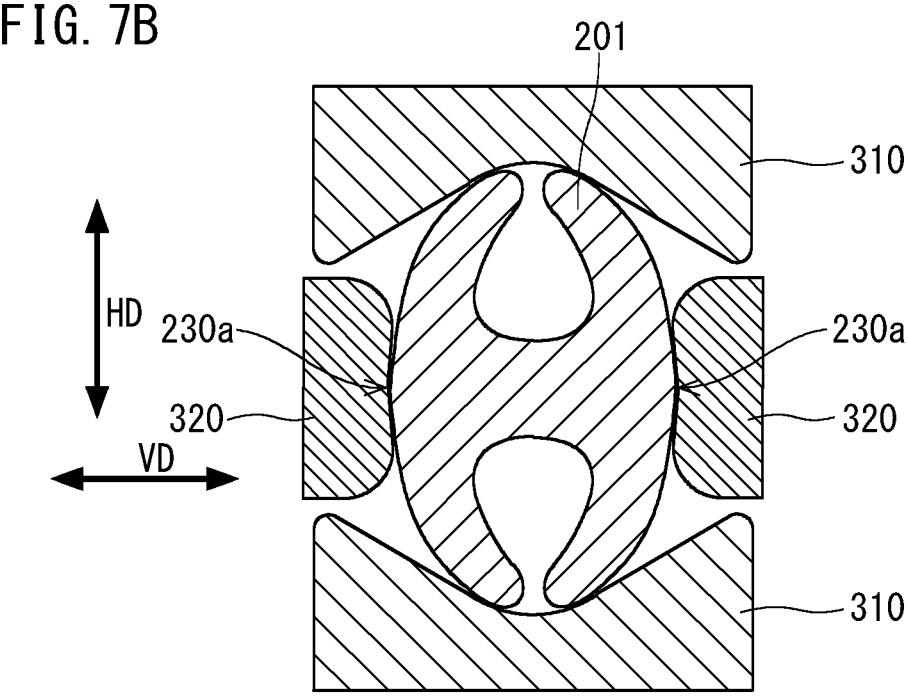
FIG. 7B is a cross-sectional view schematically showing a state on completion of deformation in the exemplary bending step shown in FIG. 7A.

The bending may be performed while the forged product 200 is held by other dies. An example of the first exemplary bending step using other dies will be described with reference to FIGS. 7A and 7B. FIGS. 7A and 7B correspond to FIGS. 6A and 6B, and an overlapping description will be omitted.

In the example shown in FIGS. 7A and 7B, bending is performed while the forged product 200 is held between two second dies 320. Specifically, the two second dies 320 hold the forged product 200 from opposite sides in the up-down direction VD by supporting the boundary 230a between the two specified rough flange parts (rough flange parts 230) protruding from the upper side of the rough web part 220 and the boundary 230a between the two specified rough flange parts (rough flange parts 230) protruding from the lower side of the rough web part 220.

Holding the forged product 200 between the second dies 320 makes it possible to perform the bending accurately.

Second Exemplary Bending Step

Figure 8A:
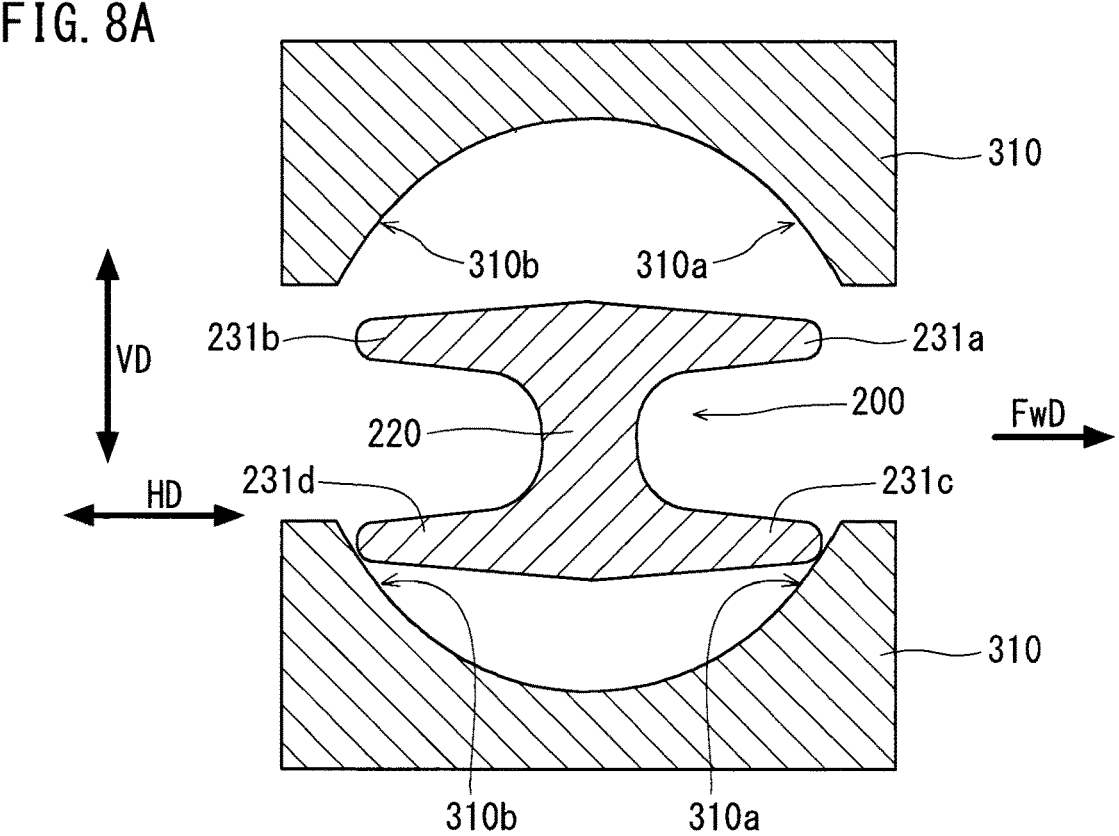
FIG. 8A is a cross-sectional view schematically showing a state before a start of deformation in still another exemplary bending step.
Figure 8B:
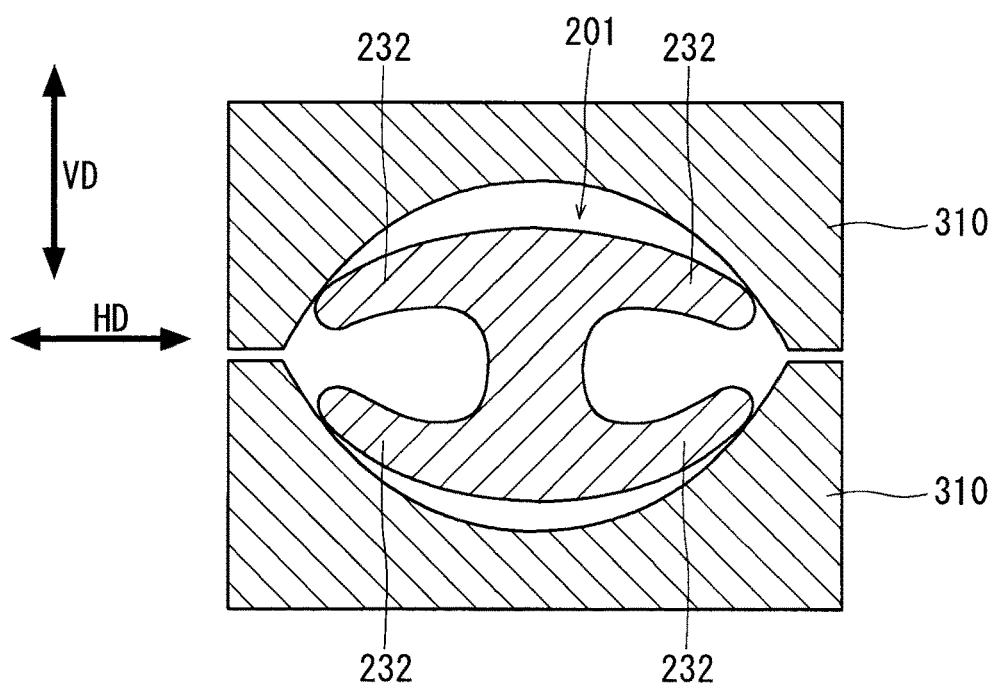
FIG. 8B is a cross-sectional view schematically showing a state on completion of deformation in the exemplary bending step shown in FIG. 8A.

The second exemplary bending step will be described with reference to FIGS. 8A and 8B. FIGS. 8A and 8B are sectional views of a part of the forged product where the bent portions 232 are to be formed. Here, the first to fourth specified rough flange parts 231a to 231d to be formed into the first to fourth specified flange parts 131a to 131d are designated as shown in FIGS. 8A and 8B. In this case, the first specified flange part 231a and the second specified flange part 231b are arranged in the front-rear direction HD of the forged product 200.

In the second exemplary bending step, first, as shown in FIG. 8A, two first dies 310 are arranged on opposite sides of the forged product 200 in the up-down direction VD. In a bending step, typically, at least one first die 310 is moved vertically (in the direction of gravitational force). Accordingly, the second exemplary bending step is carried out while the forged product 200 is positioned such that the up-down direction VD of the forged product 200 is parallel to the direction of gravitational force.

Each of the first dies 310 includes a U-shaped concave portion. The concave portion of the first die 310 includes a first inclined surface 310a and a second inclined surface 310b. In the example shown in FIG. 8A, the first inclined surface 310a and the second inclined surface 310b are curved surfaces. In this case, the angle between the first inclined surface 310a and the second inclined surface 310b varies with position. However, the angle P between a part, which come into contact with the respective specified rough flange parts, of the first inclined surface 310a and a part, which come into contact with the respective specified rough flange parts, of the second inclined surface 310b is within the range as described above.

Next, as shown in FIG. 8B, at least one of the first dies 310 is moved in the up-down direction VD of the forged product 200 to perform bending. By the bending, a forged product 201 with bent portions 232 are formed. Typically, the forged product 200 is placed on the lower first die 310, and only the upper first die 310 is moved, whereby bending is performed.

In the bending, two specified rough flange parts that are arranged in the front-rear direction HD of the forged product 200 are pressed by the first inclined surface 310a and the second inclined surface 310b, respectively, of one first die 310 at the same time. In such a bending step, two or four bent portions can be formed accurately by one pressing. In the example shown in FIGS. 8A and 8B, the four specified rough flange parts are pressed by the two first inclined surfaces 310a and the two second inclined surfaces 310b, respectively, at the same time.

Figure 9A:
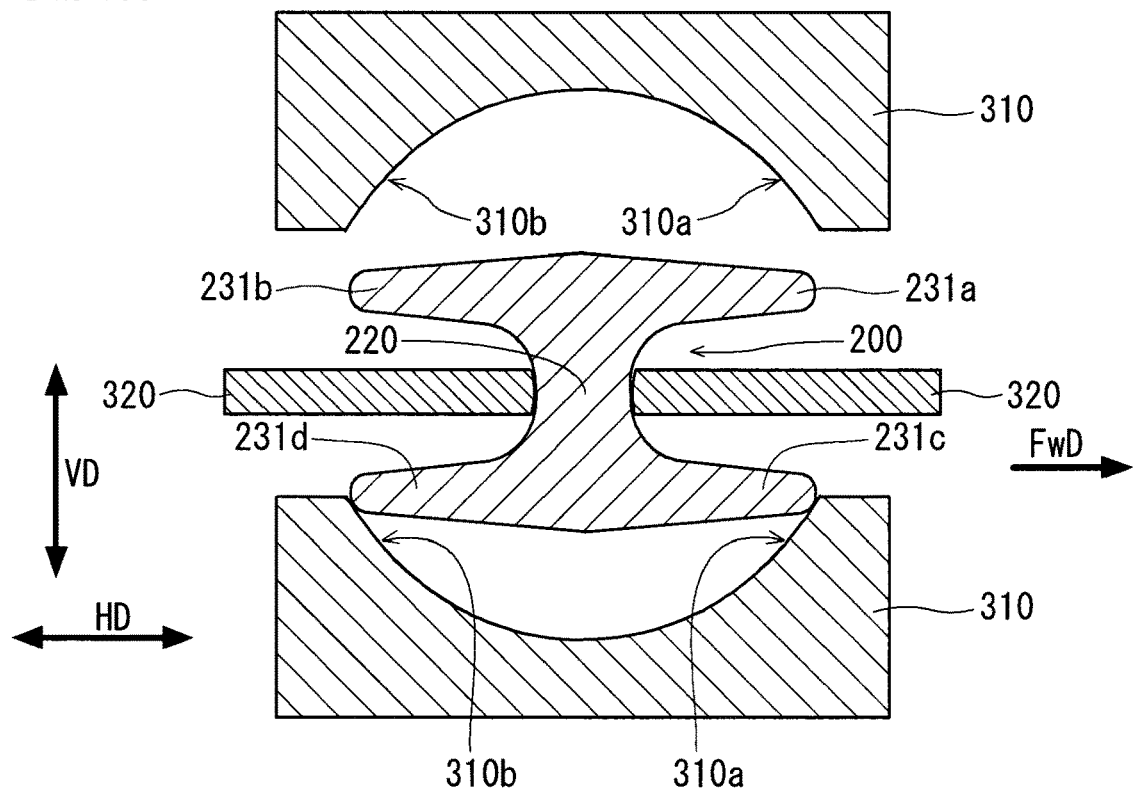
FIG. 9A is a cross-sectional view schematically showing a state before a start of deformation in still another exemplary bending step.
Figure 9B:
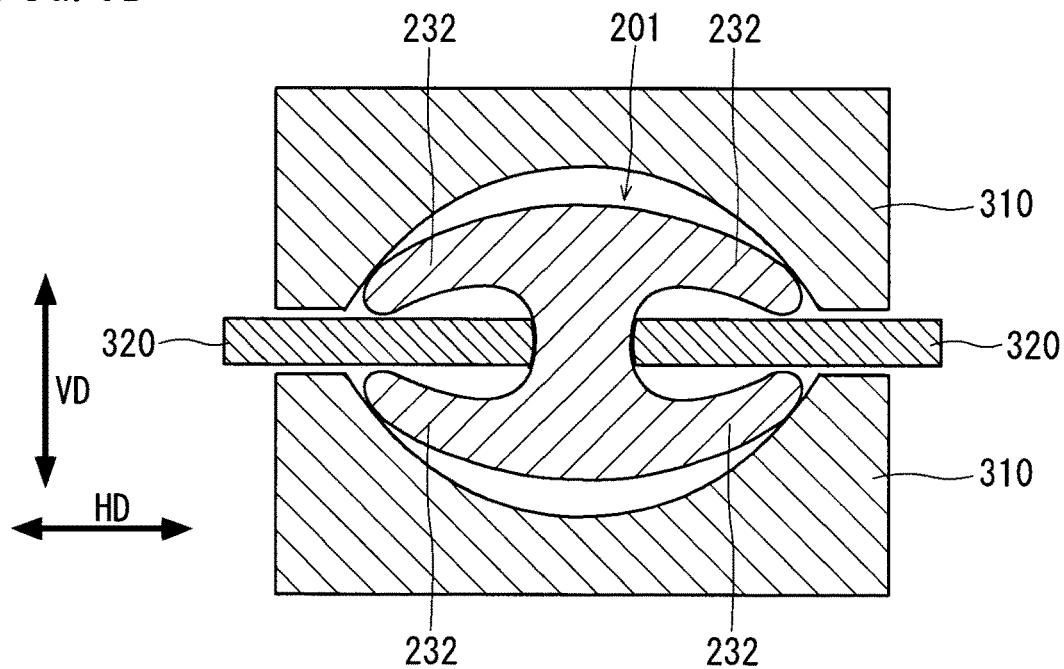
FIG. 9B is a cross-sectional view schematically showing a state on completion of deformation in the exemplary bending step shown in FIG. 9A.

The bending may be performed while the forged product 200 is held by other dies. An example of the second exemplary bending step using other dies will be described with reference to FIGS. 9A and 9B. FIG. 9A is a sectional view showing a state before the start of bending by the first dies 310. FIG. 9B is a section view showing a state on completion of the bending by the first dies 310.

In the example shown in FIGS. 9A and 9B, bending is performed while the forged product 200 is held between two second dies 320. Specifically, bending is performed while the rough web part 220 of the forged product 200 is pinched and held between the two second dies 320 from opposite sides in the front-rear direction HD.

Holding the rough web part 220 between the second dies 320 makes it possible to perform the bending accurately. Further, the second dies 320 can control deformation of the rough web part 220 during the bending.

By the bending step as described above, a forged product 201 that has almost the same outer shape as the front axle 100 is obtained. The obtained forged product 201 may be subjected to various steps as needed. Those steps include, for example, a flash-trimming step, a coining step, a boring step, a heating step, a straightening step, surface-treating step, a coating step, and the like. Then, the front axle 100 is produced.

Figure 10:
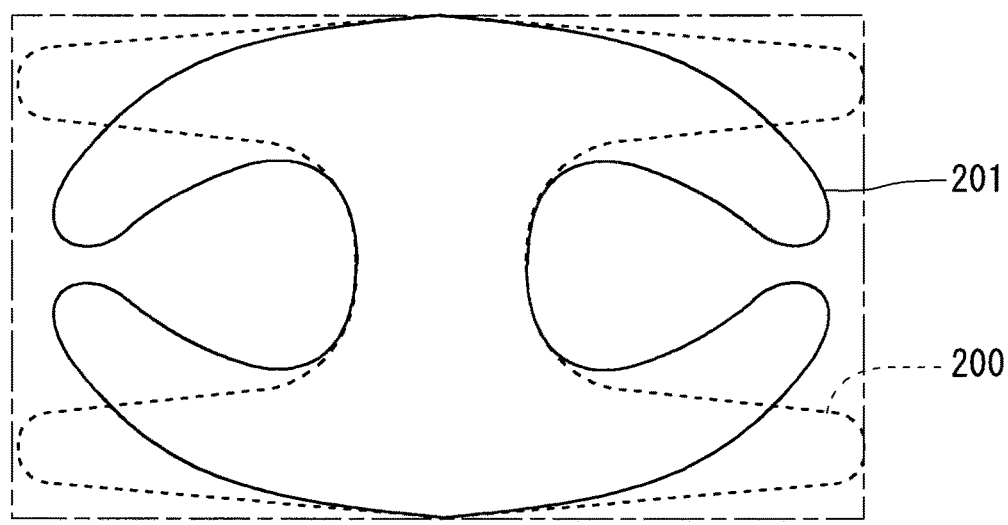
FIG. 10 is a cross-sectional view showing a change in the shape of the forged product caused by the bending step.

In FIG. 10, the outline of a cross section of the forged product 200 before processed in the bending step and the outline of a cross section of the forged product 201 after processed in the bending step are shown in an overlap manner. In FIG. 10, further, the outline of a cross section of the forged product 200 is enclosed by a rectangle drawn by an alternate long and short dash line.

One of the measures to improve the rigidity of a front axle is increasing the respective dimensions in the front-rear direction HD of the flange parts. Simply increasing the dimensions in the front-rear direction HD of the flange parts will result in an increase in the dimension in the front-rear direction HD of the front axle. In the production method according to the embodiment, however, the flange parts protruding in the front-rear direction HD are bent, which makes it possible to decrease the dimension of the front axle in the front-rear direction. Accordingly, the production method according to the embodiment makes it possible to improve the rigidity of a front axle without increasing the size.

OTHER EMBODIMENTS

In the embodiments above, a case of producing a front axle 100 in which all the four flange parts 130 are the specified flange parts. However, when only two flange parts 130 that are arranged in the front-rear direction HD or in the up-down direction VD are the specified flange parts, the front axle can be produced in a similar manner. In such a case, the first inclined surface 310a and the second inclined surface 310b of one first die 310 press the specified rough flange parts to form bent portions 232.

Figure 11:
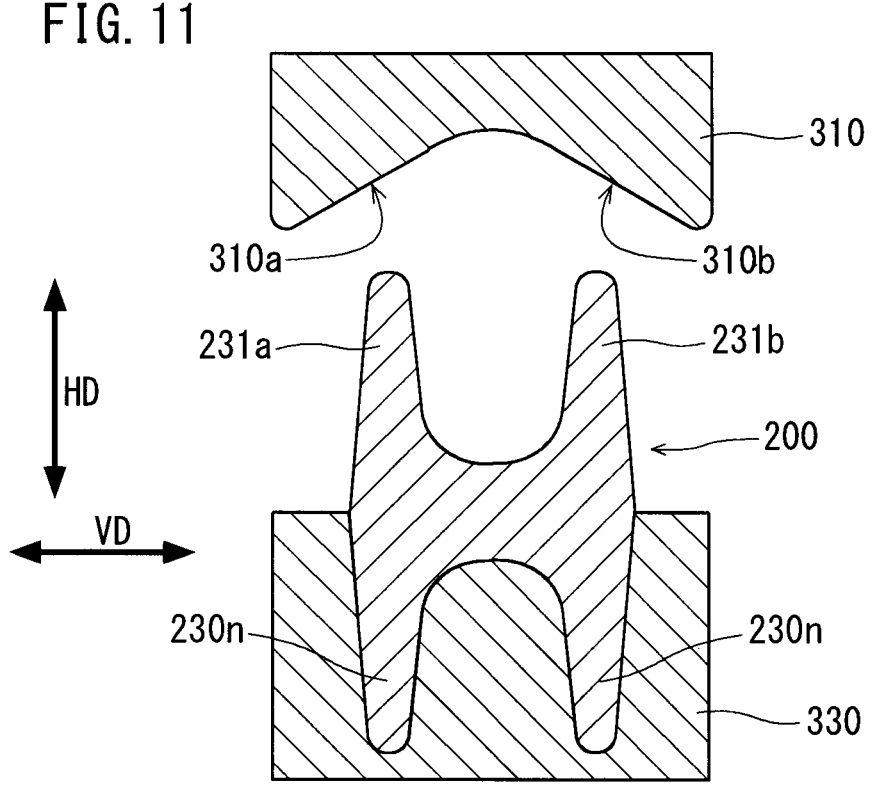
FIG. 11 is a cross-sectional view schematically showing a state before a start of deformation in still another exemplary bending step.

In the following paragraphs, a normal rough flange part that is not the specified rough flange part is referred to as a rough flange part 230n in some cases. When a specified rough flange part and a normal rough flange part 230n are arranged in the front-rear direction HD, a bent portion 232 is formed only in the specified rough flange part in the bending step. In this regard, if a force is applied only to the specified rough flange part, the normal rough flange part 230n may be displaced with the boundary between the rough web part 220 and the specified rough flange part serving as a pivot. In order to prevent such a displacement, it is preferred that the bending step is performed with the normal rough flange part 230n kept from being displaced. FIG. 11 shows an exemplary way to prevent a displacement of the normal rough flange part 230n.

The cross-sectional view of FIG. 11 shows a state before the start of shape change in the bending step. The forged product 200 shown in FIG. 11 includes a first specified rough flange part 231a and a second specified rough flange part 231b that are arranged in the up-down direction VD, and two normal rough flange parts 230n that are arranged in the up-down direction VD. The two normal rough flange parts 230n are fitted in concave portions of a third die 330. In other words, the third die 330 has concave portions in which the normal rough flange parts 230n are to be fitted in. The third die 330 prevents displacements of the two normal rough flange parts 230n. In a case where the rough flange parts 230n are displaced during the bending step, the displacements of the rough flange parts 230n are outward displacements in the up-down direction VD. Therefore, rather than the third die 330 shown in FIG. 11, a third die which holds only the respective outer sides of the normal rough flange parts 230n may be used.

When only one of the four flange parts 130 is the specified flange part, a first die with one inclined surface may be used to form a bent portion 232 in the specified rough flange part. In this case, it is preferred that the bending is performed while the normal rough flange part 230n adjacent to the specified rough flange part in the front-rear direction HD is held as described above.

EXAMPLES

The present invention will hereinafter be described in more detail by giving specific examples.

The rigidity of a beam part with a bent portion, which is an inventive example, and the rigidity of a beam part without a bent portion, which is a comparative example, were evaluated by simulation. In the simulation, samples each having a length of 100 mm and the same cross-sectional shape at any position in the length direction were used as models. Sample 1 and Sample 2 were assumed to have Young's modulus of 210 GPa and Poisson's ratio of 0.293 as their properties. The simulation was conducted by the finite element method. Sample 1 and Sample 2 were assumed to be equal in mass. In other words, Sample 1 and Sample 2 were assumed to be equal in cross-sectional area on a plane perpendicular to the length direction.

Figure 12:
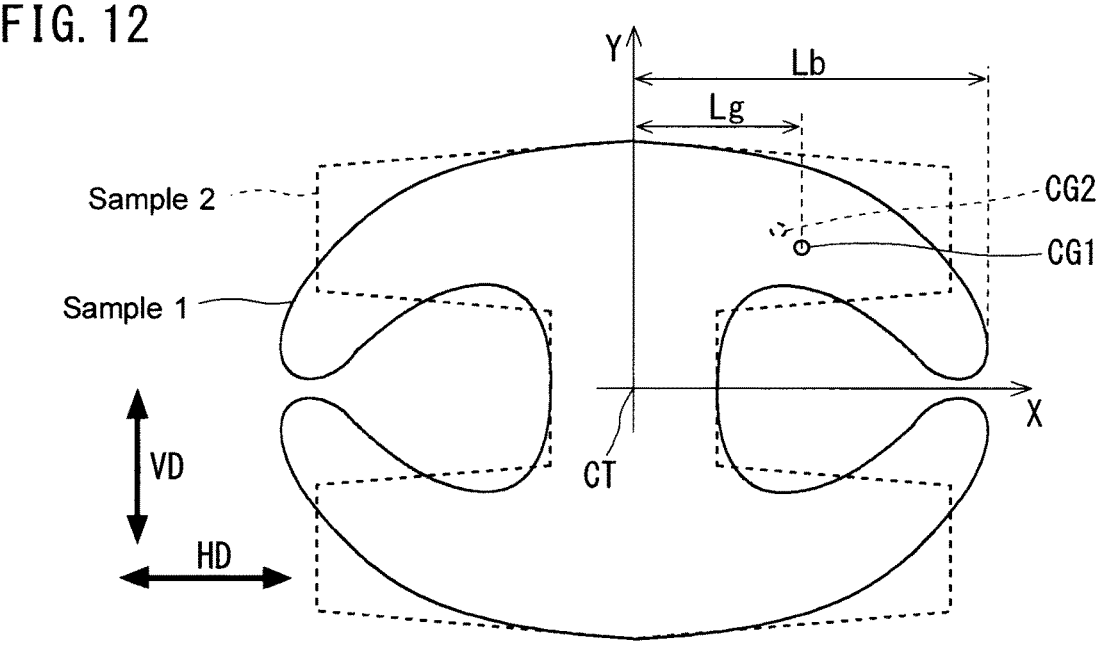
FIG. 12 is a view showing cross-sectional shapes of samples used in a simulation test.

FIG. 12 shows the cross-sectional shape of Sample 1 of an inventive example and the cross-sectional shape of Sample 2 of a comparative example. In the cross section shown in FIG. 12 (in the section perpendicular to the length direction LD), the sectional shape of Sample 1 and the sectional shape of Sample 2 are both symmetrical laterally and vertically. The flange parts of Sample 2 were assumed to protrude frontward and rearward straight in the front-rear direction HD from the upper side and the lower side of the web part. The draft angles Q and Q' (see FIG. 5) of Sample 2 were assumed to be 5 degrees.

In the sectional view of FIG. 12, an XY coordinate system was assumed with the center of gravity CT of each sample set as an origin. The X axis of the XY coordinate system was parallel to the front-rear direction HD of the beam part, and the Y axis of the XY coordinate system was parallel to the up-down direction VD of the beam part. Then, the center of gravity of the part of each sample in the positive X and positive Y region, that is, the center of gravity of a quarter cross section of each sample was calculated. The center of gravity CG1 of the quarter cross section of Sample 1 and the center of gravity CG2 of the quarter cross section of Sample 2 are shown in FIG. 12. The coordinates of these were as follows. The coordinate values indicate distance (unit: mm).

Center of gravity CG1 of Sample 1: (X, Y)=(22.608, 19.973)

Center of gravity CG2 of Sample 2: (X, Y)=(21.388, 22.768)

As shown above, the X coordinate of the center of gravity CG1 of Sample 1 of an inventive example was greater than that of the center of gravity CG2 of Sample 2. The greater X coordinate brings out an effect that an increase in second moment of area against bending deformation caused by a frontward/rearward load and an increase in polar moment of inertia against torsion are achieved while the weight is kept light.

Figure 13:
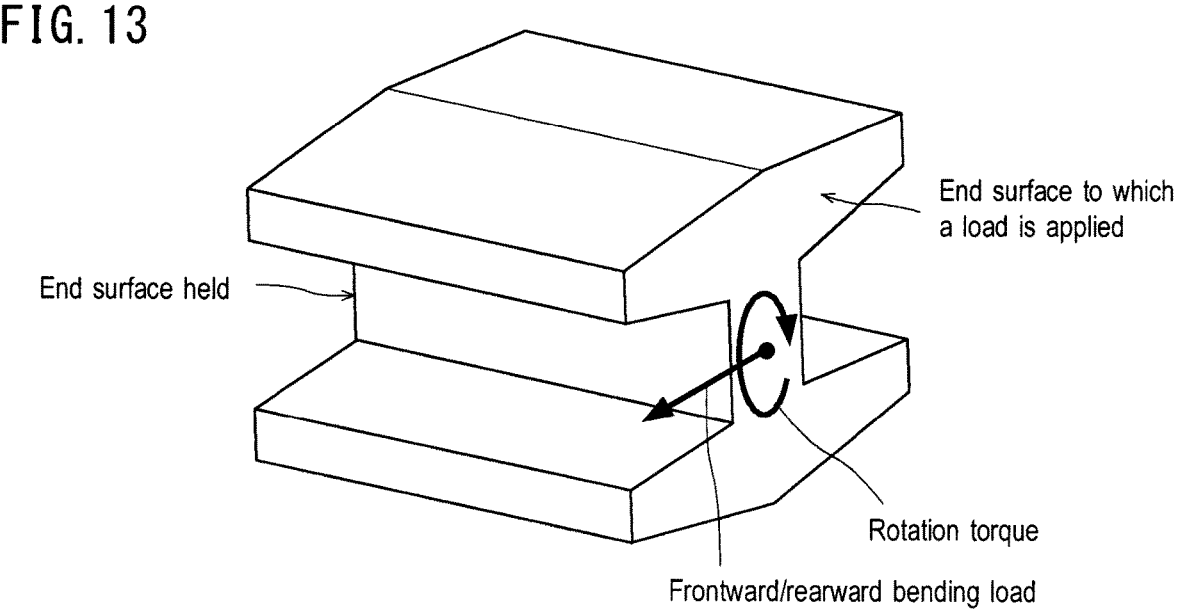
FIG. 13 is a view showing a test method adopted in the simulation test.

The rigidity of Sample 1 and Sample 2 against the loads applied thereto as shown in FIG. 13 were calculated by simulation. Specifically, while one end surface of each sample was being held, loads were applied to the other end surface in the directions shown in FIG. 13. Based on the frontward/rearward bending load shown in FIG. 13, the rigidity in the front-rear direction was calculated. Based on the rotation torque shown in FIG. 13, the torsional rigidity was calculated. The results are shown in Table 1.

TABLE 1

| | Rigidity (N/m) | | |
| --- | --- | --- | --- |
| | Sample 1 | Sample 2 (Comparative Example) | Rigidity of Sample 1/ Rigidity of Sample 2 (%) |
| Rigidity in Front-Rear Direction | $1.7759 \times 10^6$ | $1.7745 \times 10^6$ | 100.1 |
| Torsional Rigidity | $2.2492 \times 10^6$ | $1.8784 \times 10^6$ | 119.7 |

As shown in TABLE 1, the rigidity in the front-rear direction of Sample 1 of an inventive example was the same or higher than that of Sample 2 of a comparative example. The torsional rigidity of Sample 1 was much higher than that of Sample 2.

The results show that a front axle including a beam part with a bent portion according to the embodiment has increased rigidity with the same weight. This means that it is possible to reduce the weight of the front axle without decreasing the rigidity. This further means that it is possible to obtain a front axle having a cross-sectional size comparable to or smaller than that of a conventional front axle and having rigidity comparable to or higher than that of the conventional front axle.

INDUSTRIAL APPLICABILITY

The present invention is applicable to front axle beams.

LIST OF REFERENCE SYMBOLS

100: front axle (front axle beam)
110: beam part
111: spring attachment seat
120: web part
130: flange part
132: bent portion
150: king-pin attachment part
210: rough beam part
220: rough web part
230: rough flange part
310: first die
310a: first inclined surface
310b: second inclined surface
320: second die
330: third die
LD: length direction
HD: front-rear direction
VD: up-down direction

The invention claimed is:

1. A front axle beam comprising a beam part, and two king-pin attachment parts provided to both ends of the beam part with respect to a length direction of the beam part, wherein:
the beam part includes a web part extending in the length direction, and four flange parts protruding frontward and rearward from an upper side and a lower side of the web part, respectively;

at least one of the four flange parts is a specified flange part including a bent portion;

the bent portion is bent to become closer to another one of the flange parts that is opposed to the specified flange part as a distance from its edge decreases; and an inclination angle of the bent portion relative to a horizontal direction becomes greater as a distance from a boundary between the specified flange part and the web part increases.

2. The front axle beam according to claim 1, wherein the four flange parts include two specified flange parts that are arranged in a front-rear direction or in an up-down direction.

3. A method for producing a front axle beam including a beam part and two king-pin attachment parts attached to both ends of the beam part with respect to a length direction of the beam part, the beam part including a web part extending in the length direction, and four flange parts protruding frontward and rearward from an upper side and a lower side of the web part, respectively, the method comprising:

a die forging step of forging a steel material with dies to produce a forged product that includes a rough web part to be formed into the web part, and four rough flange parts protruding frontward and rearward from an upper side and a lower side of the rough web part, respectively; and a bending step of pressing at least one specified rough flange part, which is at least one of the four rough flange parts, of the forged product with at least one first die to form a bent portion in the specified rough flange part, the bent portion being bent inward in an up-down direction of the forged product.

4. The method according to claim 3, wherein:

the at least one specified rough flange part includes a first specified rough flange part and a second specified rough flange part that are arranged in a front-rear direction or in the up-down direction;

the first die includes a first inclined surface and a second inclined surface that form an angle smaller than 180 degrees with each other; and in the bending step, the first specified rough flange part is pressed by the first inclined surface of the first die, and the second specified rough flange part is pressed by the second inclined surface of the first die.

5. The method according to claim 3, wherein:

a not-to-be-bent rough flange part, which is another one of the rough flange parts and which will not have a bent portion, and the specified rough flange part are arranged in the front-rear direction; and in the bending step, the bent portion is formed in the specified rough flange part while the not-to-be-bent rough flange part is held.

6. The method according to claim 4, wherein:

the at least one specified rough flange part includes a first, a second, a third and a fourth specified rough flange part; and in the bending step, the first and second specified rough flange parts are pressed by the first inclined surface and the second inclined surface, respectively, of one first die, and at the same time, the third and fourth specified rough flange parts are pressed by the first inclined surface and the second inclined surface, respectively, of another first die.

7. The method according to claim 4, wherein:

the first and second specified rough flange parts are arranged in the up-down direction of the forged product; and the bending step is performed by moving the first die in the front-rear direction.

8. The method according to claim 7, wherein the bending step is performed while a boundary between the two rough flange parts protruding from the upper side of the rough web part and a boundary between the other two rough flange parts protruding from the lower side of the rough web part are supported by two second dies, respectively, from opposite sides in the up-down direction.

9. The method according to claim 4, wherein:

the first and second specified rough flange parts are arranged in the front-rear direction of the forged product; and the bending step is performed by moving the first die in the up-down direction of the forged product.

10. The method according to claim 9, wherein the bending step is performed while the rough web part is held between two second dies from opposite sides in the front-rear direction.

* * * * *